No. 659,067. Patented Oct. 2, 1900.
W. J. IRWIN.
REELING MACHINE.
(Application filed Feb. 27, 1900.)
(No Model.) 2 Sheets—Sheet 1.
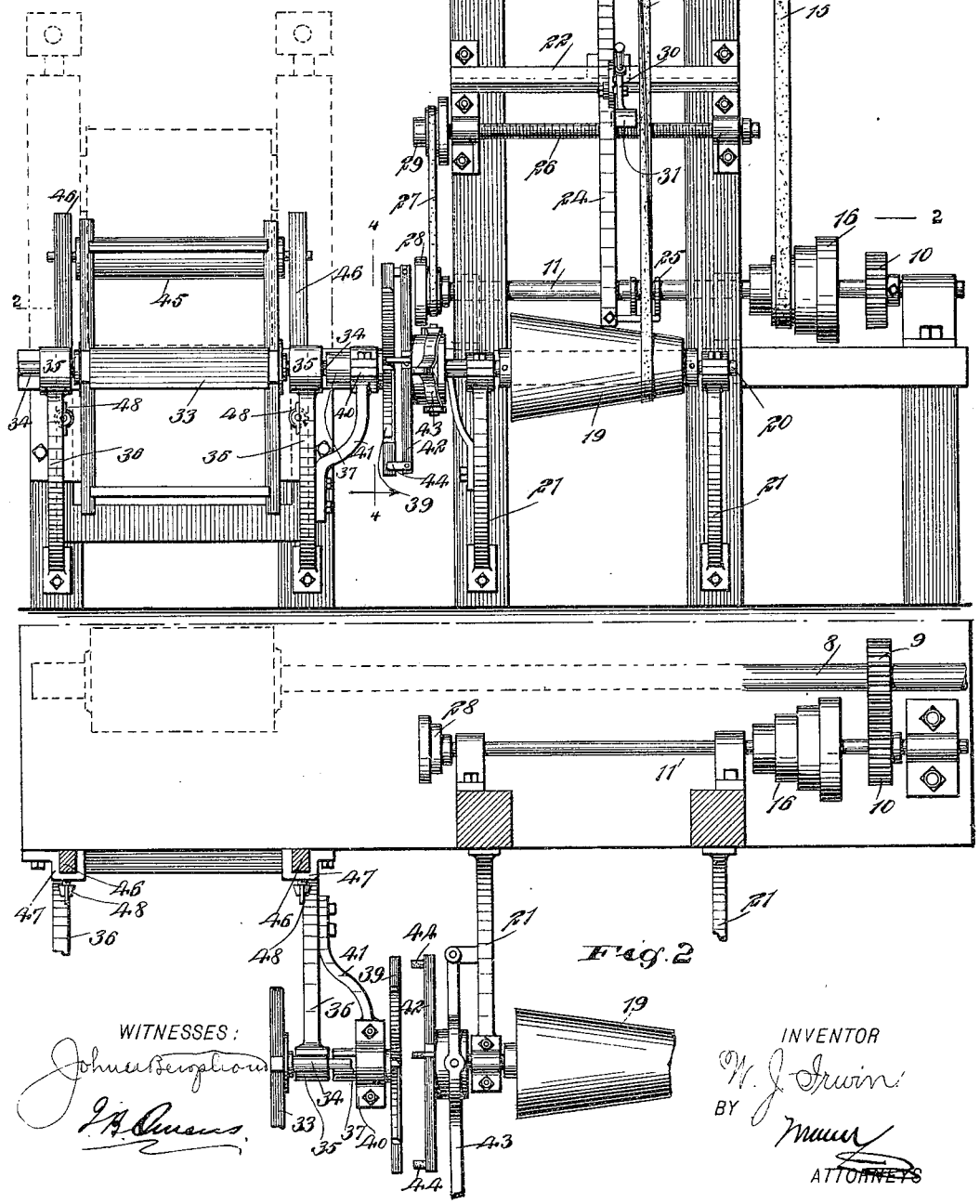

No. 659,067. Patented Oct. 2, 1900.
W. J. IRWIN.
REELING MACHINE.
(Application filed Feb. 27, 1900.)
(No Model.) 2 Sheets—Sheet 2.
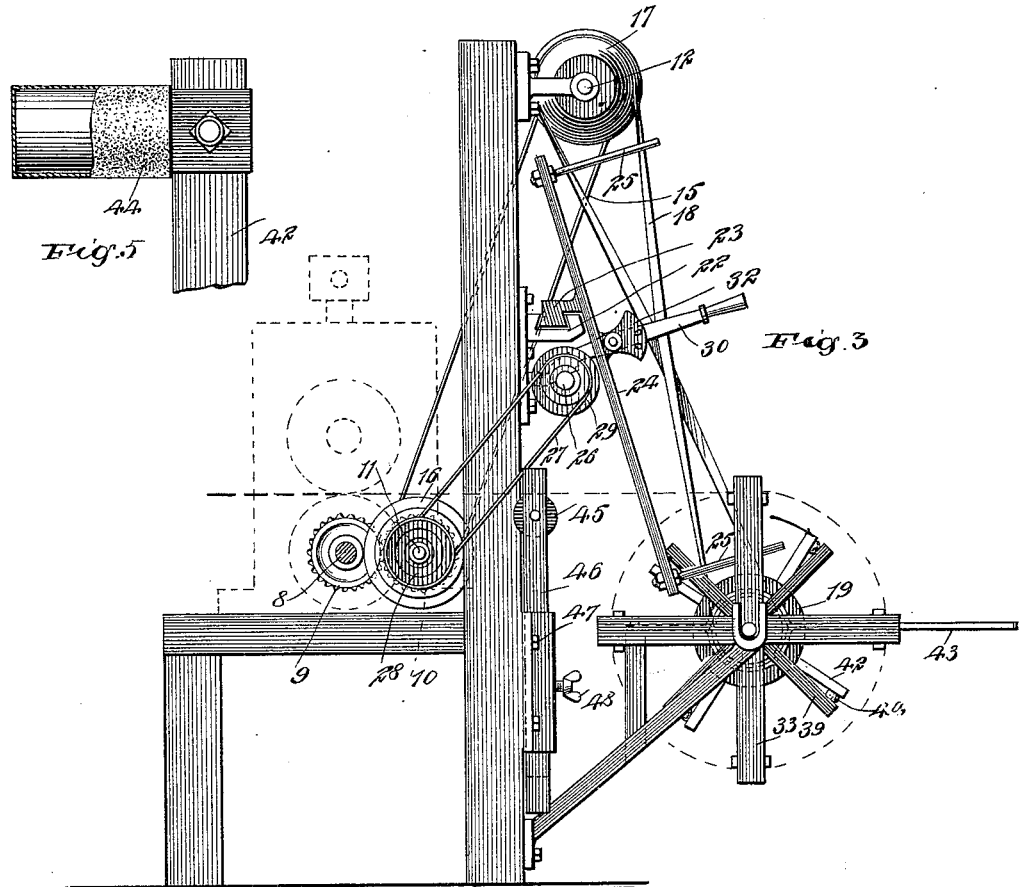
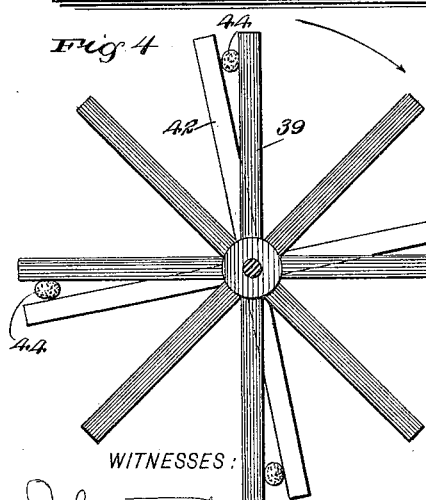
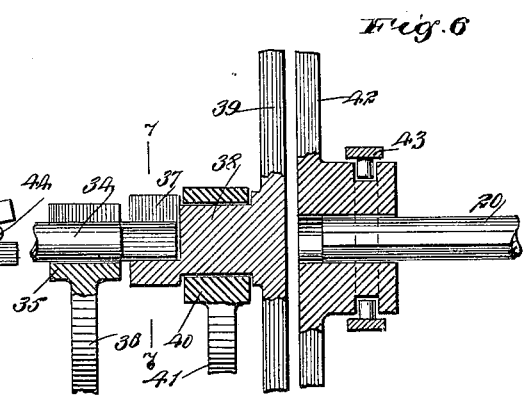
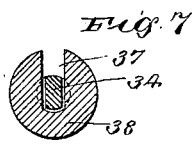
WITNESSES:
INVENTOR
W. J. Irwin
BY
ATTORNEYS

UNITED STATES PATENT OFFICE.

WILLIAM JOHN IRWIN, OF HOBOKEN, NEW JERSEY.

REELING-MACHINE.

SPECIFICATION forming part of Letters Patent No. 659,067, dated October 2, 1900.

Application filed February 27, 1900. Serial No. 6,711. (No model.)

*To all whom it may concern:*

Be it known that I, WILLIAM JOHN IRWIN, a citizen of the United States, and a resident of Hoboken, in the county of Hudson and State of New Jersey, have invented a new and Improved Reeling-Machine, of which the following is a full, clear, and exact description.

This invention relates to a reeling attachment for tin-foil machines, its purpose being to provide mechanism for uniformly drawing off the tin-foil, so that it will be properly wound on the reel and its breakage avoided, to which end I employ certain novel mechanism for driving the reel automatically in time with the tin-foil mill.

This specification is the disclosure of one form of the invention, while the claims define the actual scope thereof.

Reference is to be had to the accompanying drawings, forming a part of this specification, in which similar characters of reference indicate corresponding parts in all the views.

Figure 1 is a front view of the invention. Fig. 2 is a sectional plan thereof on the line 2 2 of Fig. 1. Fig. 3 is a side elevation. Fig. 4 is an elevation of the clutch with the shaft in section on the line 4 4 of Fig. 1. Fig. 5 is a detail of one of the fingers of the clutch. Fig. 6 is a detail section of the clutch and the parts adjacent thereto, and Fig. 7 is a section on the line 7 7 of Fig. 6.

In Figs. 2 and 3 the shaft 8 may be supposed to be the journal of one of the rollers of the tin-foil mill, between which rollers the foil is passed to be rolled into the proper thickness. This shaft 8 has a gear 9 thereon, meshed with a gear 10 on a shaft 11, mounted parallel with the shaft 8 and in a suitable framing, as shown. Mounted in the framing some distance above the shaft 11 is a shaft 12, which is parallel with the shaft 11 and carries a stepped pulley 14, over which runs a belt 15, also running over a stepped pulley 16 on the shaft 11, whereby to drive the shaft 12 from the shaft 11.

The shaft 12 carries a cone-pulley 17, around which a belt 18 passes, and this belt 18 passes downward and forwardly around a cone-pulley 19, mounted fast on a shaft 20, held to turn in brackets 21, projecting forwardly from the framing of the apparatus. It will be seen, therefore, that the shaft 20 is driven in time with the shaft 8. By regulating the position of the belt 15 on the stepped pulleys 14 and 16 the speed of the shaft 12 may be regulated, and by shifting the belt 18 on the pulleys 17 and 19 the speed of the shaft 20 may be regulated. The purpose of this gearing is to enable the speed of the shaft 20 to be controlled to the utmost nicety, and by the peculiar arrangement shown I am able to do this. The adjustment of the speed of the shaft 20 is approximately secured by shifting the belt 15 on the pulleys 14 and 16, and then by shifting the belt 18 a finer adjustment is attained. I provide means for automatically shifting this belt in time with the accumulation of tin-foil on the reel, whereby the tin-foil is drawn upon the reel at a uniform speed, notwithstanding the size of the reel may vary with the accumulation of the tin-foil. I also provide means for manually adjusting this belt, which I will now describe. A track 22 is mounted on the framing approximately between the pulleys 17 and 19 and parallel with the axes thereof. In this track 22 runs the foot 23 of a belt-shifter comprising a body-bar 24 and forks 25, the forks 25 engaging the belt 18 adjacent to the respective pulleys 17 and 19. By moving the belt-shifter the belt 18 may be moved as desired. A screw 26 is mounted to turn in the frame just below the track 22, and this screw is driven by a belt 27, passing from a pulley 28 on the shaft 11 to a pulley 29 on the screw 26. On the body-bar 24 of the belt-shifter is fulcrumed a hand-lever 30, at the rear end of which a half-nut 31 is formed, such nut running on the screw 26. A quadrant 32 is fastened to the body-bar 24 of the belt-shifter, and the hand-lever 30 is provided with suitable devices for engaging this quadrant, so as to hold the hand-lever in the position shown in Figs. 1 and 3, in which position the nut 31 is engaged with the screw 26, and so also as to hold the hand-lever 30 with its front end thrown downward, thus raising the nut out of engagement with the screw 26. When the nut 31 is engaged with the screw 26, the rotary movement of the screw will steadily advance the belt-shifter exactly with respect to the pulleys 17 and 19 and the belt will be shifted along the pulleys, thus automatically varying the speed of the shaft 20. It will be understood that the reel turning the successive folds of tin-foil thereon will gradually increase in peripheral size, so that it is necessary to gradually decrease the speed of the reel in order that the tin-foil may be drawn uniformly from the rollers. By this screw 26 I am enabled to attain this result. Should the operator desire at any time to move the belt 18 manually, this may be done by throwing the hand-lever 30 down and applying manual force to the belt-shifter, moving the belt 18, as will be understood.

The reel 33 may be of any desired form, except that it is provided with two journals 34, which are mounted in boxes 35, attached to brackets 36, carried suitably on the framing of the machine. The inner journal 34 of the reel 33 is flattened, as shown best in Fig. 7, and is fitted into a recess 37, formed in the hub 38 of the clutch member 39. This hub 38 is mounted to turn in a box 40, carried by an arm 41, attached to one of the brackets 36. (See Fig. 2.) By these means the reel is driven from the clutch member 39, and the reel may be disconnected from this clutch member by raising the reel, thus moving the inner journal 34 out of the recess 37 of the clutch member. When the journal 34 of the reel is engaged with the hub of the clutch member 39, the reel and clutch member are connected fast with each other. The shaft 20 has a clutch member 42 splined thereon. This clutch member 42 works with the clutch member 39, as best shown in Fig. 6, and the clutch member 42 is actuated by a hand-lever 43, fulcrumed on one of the brackets 21, as shown. By engaging the clutch members 39 and 42 the reel 33 will be driven from the shaft 20, which operation will be fully described hereinafter. The clutch members are formed of radially-disposed arms, as best shown in Fig. 4, such arms being mounted on the respective hubs, and the clutch member 39 is provided with a larger number of arms than the clutch member 42. As here shown, I employ eight arms on the member 39 and four arms on the member 42. The member 42 has each arm provided with a laterally-projecting finger 44, covered with a suitable cushion, (see Fig. 5,) these fingers projecting into the path of the arms of the clutch member 39, whereby to engage the clutch members, as shown in Fig. 1. By throwing the hand-lever 43 to the left the clutch member 42 may be engaged with the member 39, and by throwing the hand-lever in the opposite direction the clutch member will be disengaged. (See Fig. 2.) For the purpose of carrying the foil as it comes from the machine I provide a roller 45, mounted back of the reel 33 and carried on vertically-disposed bars 46, which are arranged to slide vertically in guides 47, (see Fig. 2,) such guides being attached to the framing of the machine and provided with set-screws 48, enabling them to hold the bars 46 in any desired adjustment. By these means the roller 45 may be adjusted to suit the size of the reel and the other conditions of the machine. This roller serves to carry the tin-foil to the reel and prevents the foil from sagging in its passage and also causes the foil to run true on the reel, as will be understood.

In using the apparatus the starting of the tin-foil mill will cause the shaft 11 to be driven at the same speed as the shaft 8. The operator now adjusts the belt 15 so that the shaft 12 will be driven at approximately the proper speed. Then the tin-foil is led to the reel 33, and this reel is turned manually through the medium of the arms of the clutch member 39, during which operation the operator determines the proper speed at which the reel should be driven so as to enable it to properly take up the tin-foil as it is delivered from the mill. Meanwhile the operator with his other hand should so manipulate the belt-shifter 24 as to place the belt 18 in such position that the clutch member 42 of the shaft 20 will be driven at exactly the same speed as the reel 33. This may be readily determined by watching the arms of the several clutch members, and when they travel together, the operator should then throw the hand-lever 43, engaging the clutch members with each other, and then the reel will be driven automatically. When this has been done, the hand-lever 30 should be thrown up to engage the nut 31 with the screw 26, and the operation of this screw will then serve to advance the belt-carrier steadily and slowly, and the belt 18 will be gradually shifted to decrease the speed of the reel in time with the accumulation of the tin-foil thereon, the result of which operation is that the tin-foil is taken from the mill at a uniform speed.

Having thus described my invention, I claim as new and desire to secure by Letters Patent—

1. In a reeling apparatus, the combination of a driven shaft, a stepped pulley thereon, a second shaft, a stepped pulley on the second shaft, a belt passing between said pulleys, a third shaft, a cone-pulley on the second shaft, a cone-pulley on the third shaft, a belt passing between the cone-pulleys, a belt-shifter working with the belt of the cone-pulleys and driven continuously from the first-named or driven shaft to steadily shift the speed, and reeling devices driven from the third shaft.

2. The combination of a driven shaft, a second shaft, adjustable gearing for driving the second shaft from the first-named or driven shaft, a third shaft, cone-pulleys on the second and third shafts, a belt passing between the cone-pulleys, a belt-shifter working with the belt and driven continuously from the first or driven shaft to steadily shift the belt, and reeling devices driven from the third shaft.

3. The combination of a drive-shaft, a second shaft driven therefrom, a third shaft, cone-pulleys on the second and third shafts, a belt passing between the cone-pulleys, a belt-shifter working with the belt, a screw driven continuously from the drive-shaft, a nut carried on the belt-shifter and engaging the screw, whereby to automatically drive the belt-shifter and steadily shift the belt, and reeling devices connected with the third shaft.

4. In a reeling-machine, the combination of a driven shaft, a clutch member splined thereon, a second clutch member mounted to turn and serving to be engaged by the first-named clutch member, the second clutch member having a notched hub, and a reel, the journal of which is removably fitted in said notched hub.

5. In a reeling-machine, the combination of a drive-shaft, a clutch member splined thereon, a second clutch member, the hub of which is mounted to turn and formed with a notch therein, the first-named clutch member being movable to engage and disengage the second clutch member, and a reel, one of the journals of which is formed with a flattened portion removably fitted within the notch of the hub of the second clutch member.

In testimony whereof I have signed my name to this specification in the presence of two subscribing witnesses.

WILLIAM JOHN IRWIN.

Witnesses:
F. B. OWENS,
JNO. M. RITTER.